No. 858,887. PATENTED JULY 2, 1907.
J. MILLEN.
MACHINE FOR FORMING EDGES OF PLATES.
APPLICATION FILED FEB. 5, 1907.

5 SHEETS—SHEET 1.

WITNESSES, INVENTOR,

No. 858,887. PATENTED JULY 2, 1907.
J. MILLEN.
MACHINE FOR FORMING EDGES OF PLATES.
APPLICATION FILED FEB. 5, 1907.

5 SHEETS—SHEET 2.

WITNESSES, INVENTOR,

No. 858,887. PATENTED JULY 2, 1907.
J. MILLEN.
MACHINE FOR FORMING EDGES OF PLATES.
APPLICATION FILED FEB. 5, 1907.

5 SHEETS—SHEET 3.

WITNESSES,
INVENTOR,

No. 858,887. PATENTED JULY 2, 1907.
J. MILLEN.
MACHINE FOR FORMING EDGES OF PLATES.
APPLICATION FILED FEB. 5, 1907.

5 SHEETS—SHEET 4.

WITNESSES.
INVENTOR.

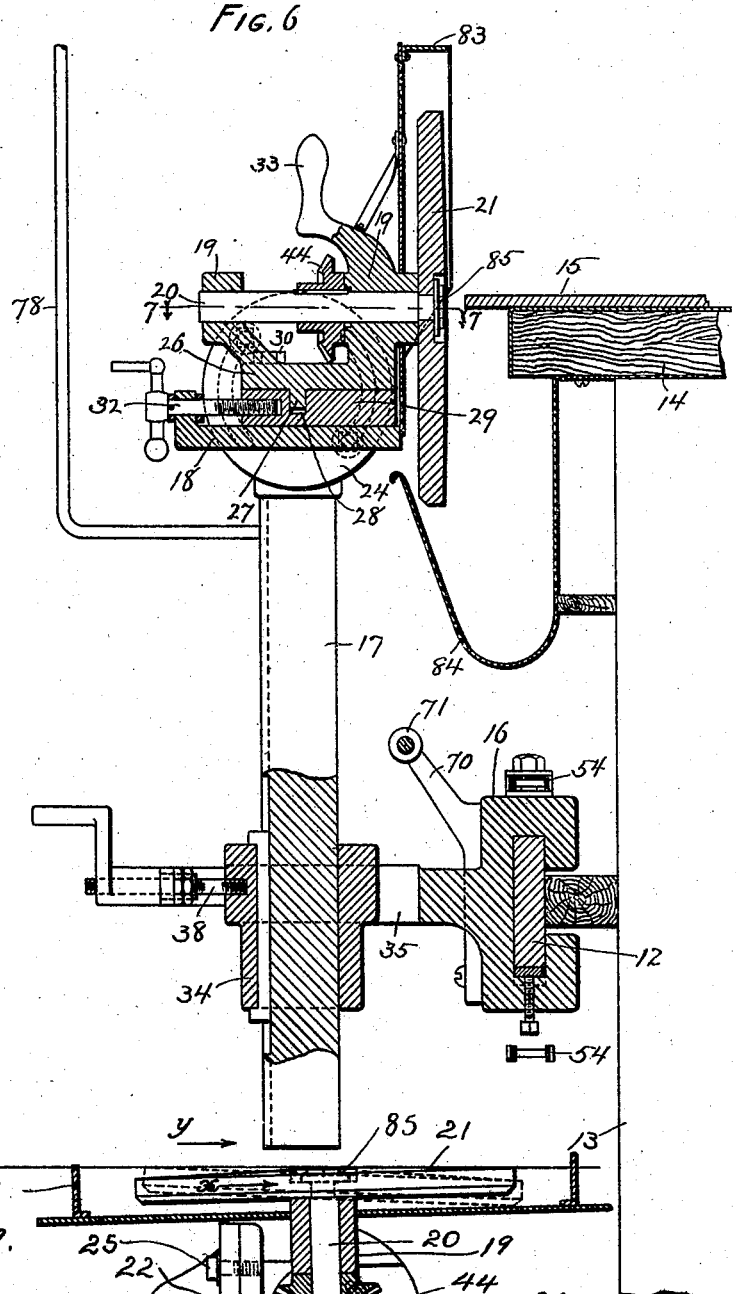

UNITED STATES PATENT OFFICE.

JAMES MILLEN, OF REVERE, MASSACHUSETTS.

MACHINE FOR FORMING EDGES OF PLATES.

No. 858,887.          Specification of Letters Patent.          Patented July 2, 1907.

Application filed February 5, 1907. Serial No. 355,847.

*To all whom it may concern:*

Be it known that I, JAMES MILLEN, of Revere, in the county of Suffolk and State of Massachusetts, have invented certain new and useful Improvements in Machines for Forming Edges of Plates, of which the following is a specification.

This invention relates to machines for forming a true edge surface on a sheet of plate glass or other material, the chief object of the invention being to bevel the edges of plate glass sheets intended for show windows, where two sheets of glass are abutted together, edge to edge, to form an angle, clamps being employed at intervals to hold the edges in contact with each other.

It is very desirable that the two contacting edges be finished with great accuracy, in order that they may have a practically air and water tight fit against each other. On large sheets or panes of plate glass it has heretofore been a matter of considerable difficulty to form the abutting edges absolutely straight and true and at the desired angle to the sides of the plate.

My invention is embodied in certain improved mechanism for accurately and expeditiously forming the edges of sheets or panes of plate glass, all as hereinafter described and claimed.

Figure 1:
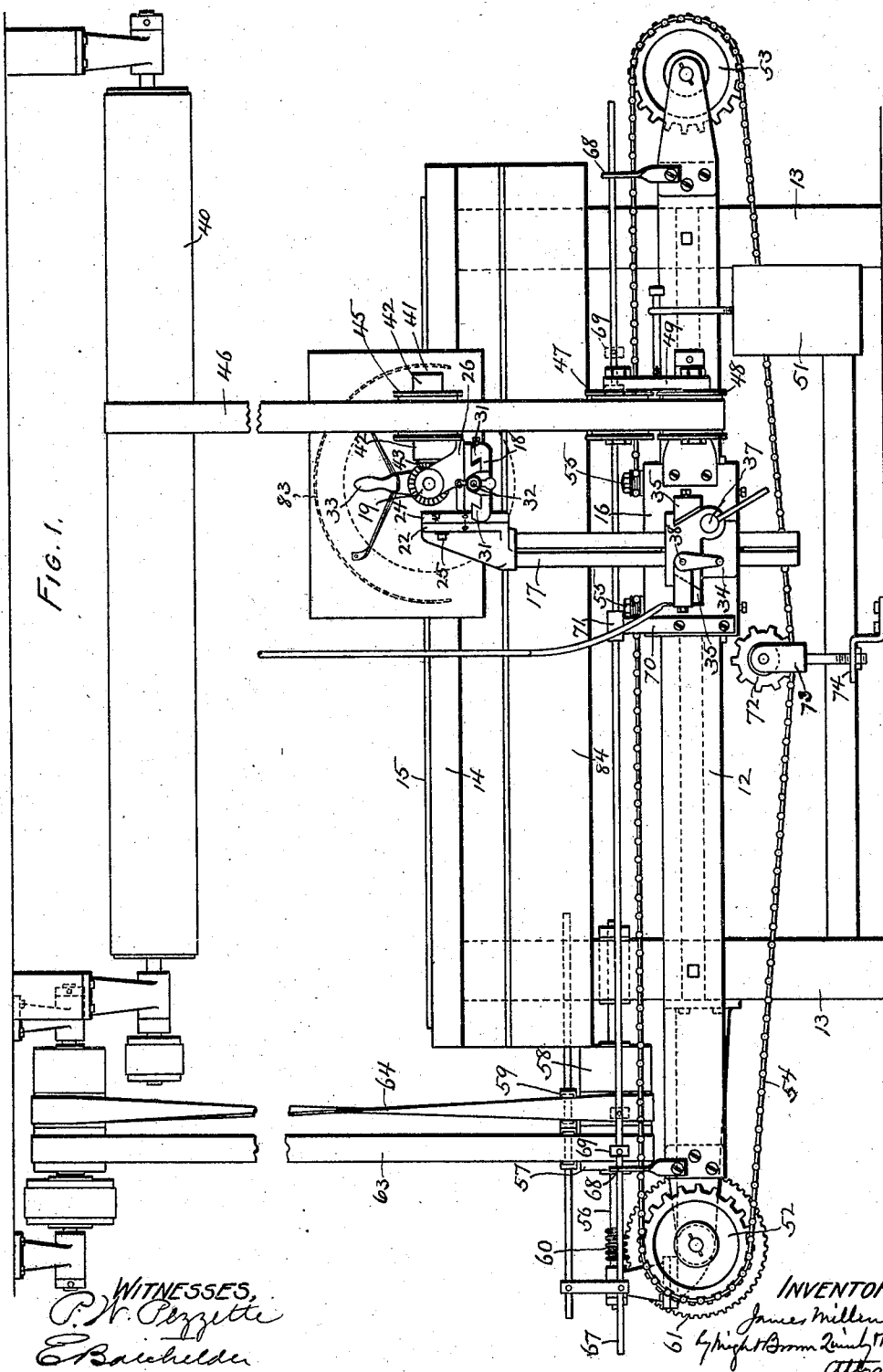
Figure 2:
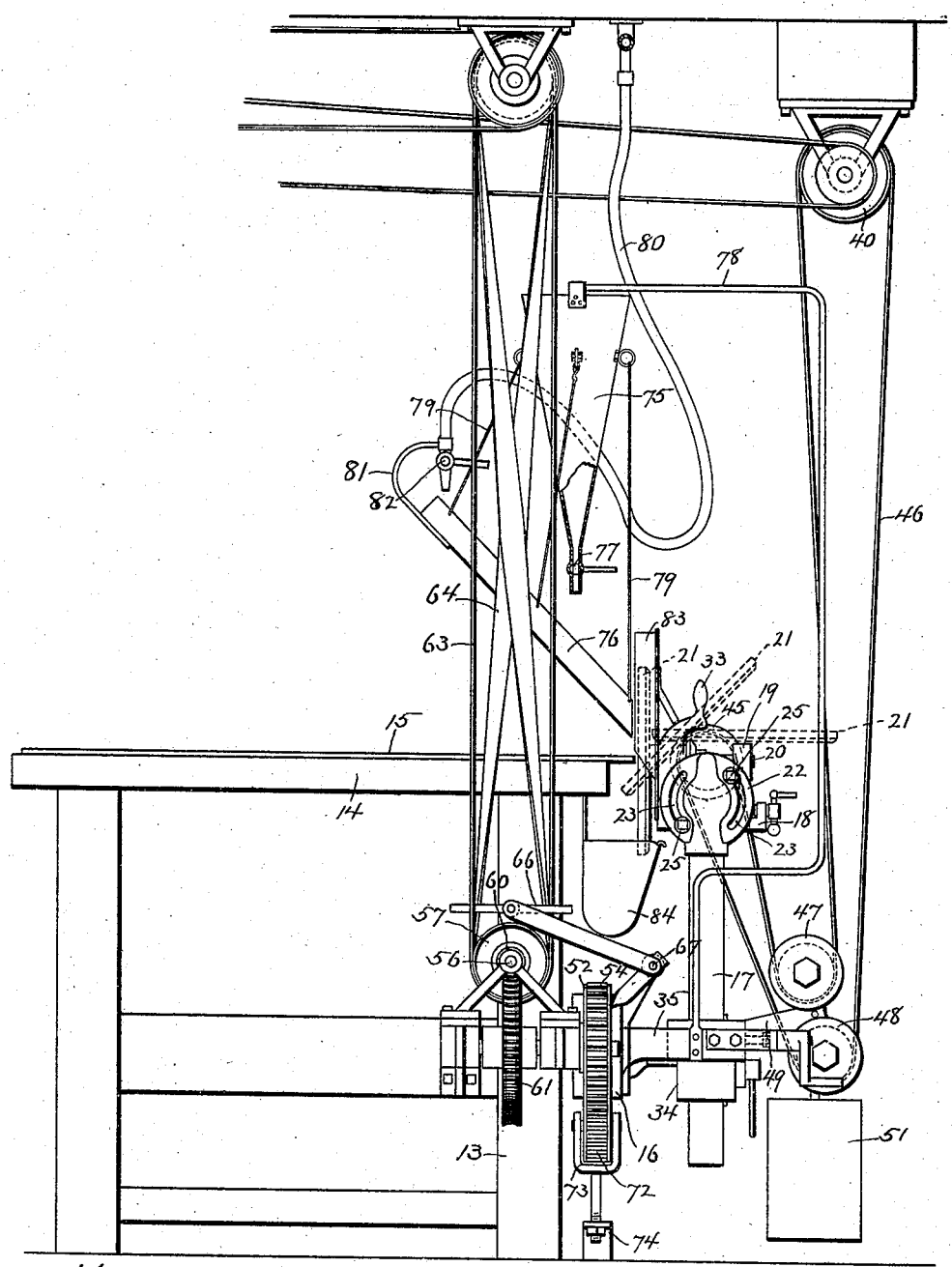
Figures 3, 4:
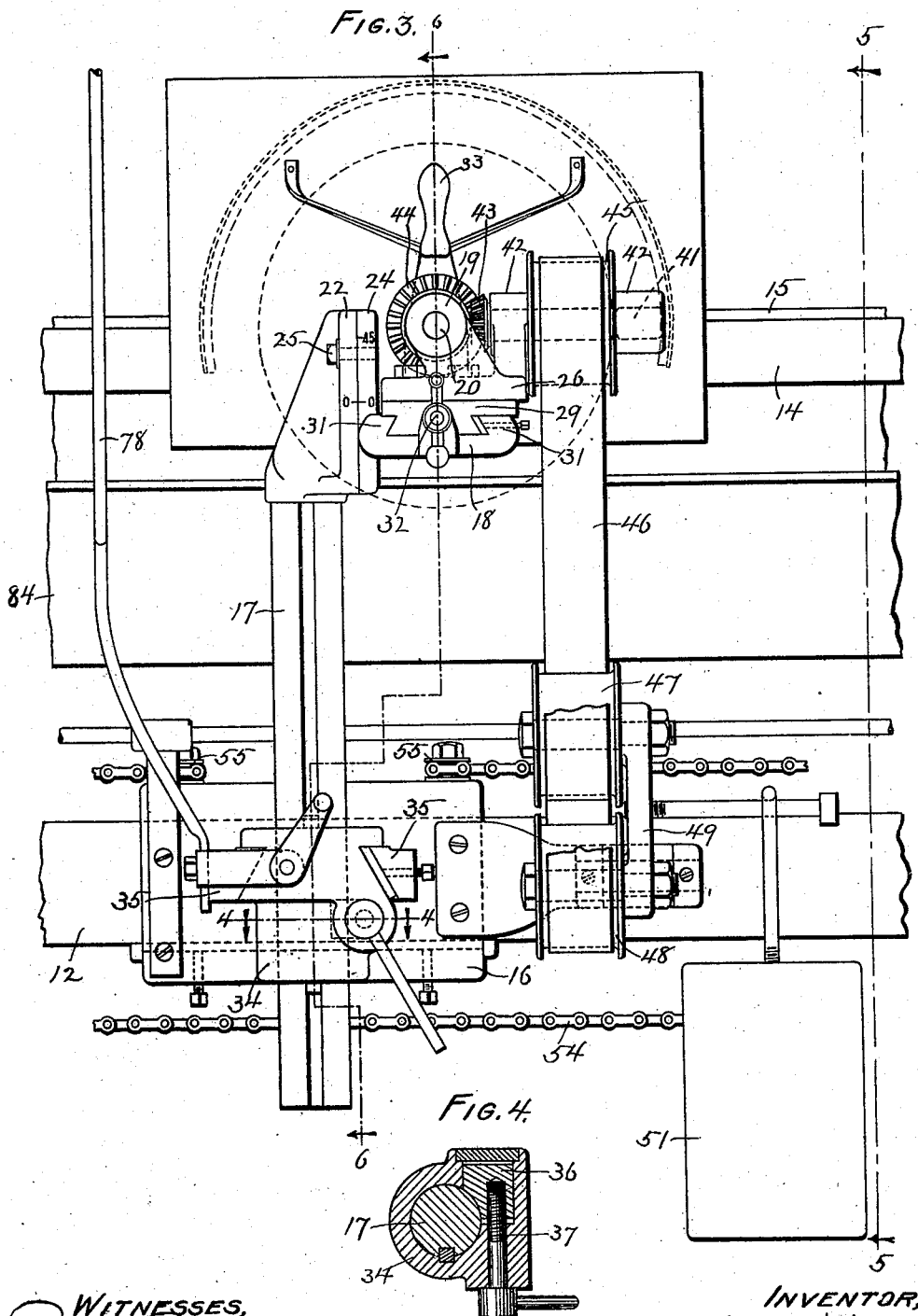
Figure 5:
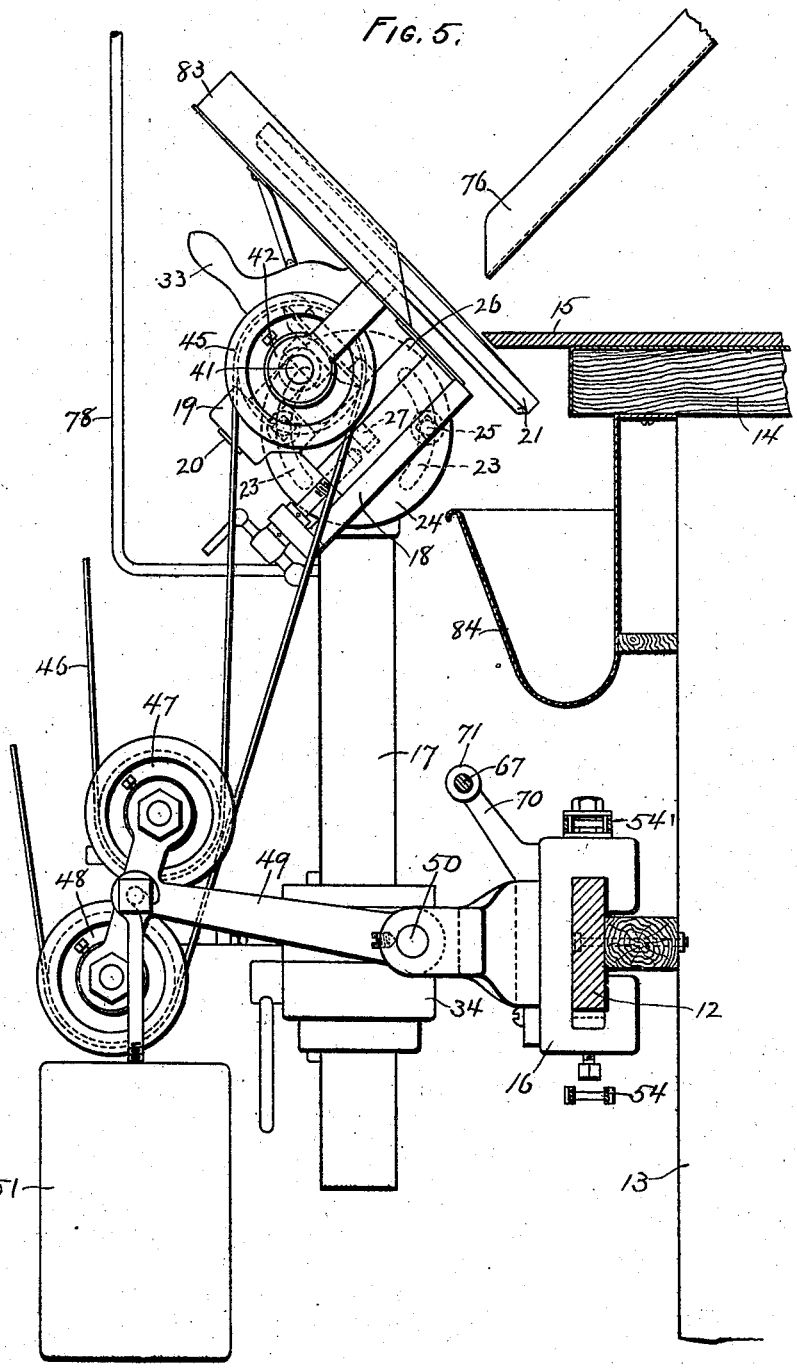

Of the accompanying drawings, forming a part of this specification,—Figure 1 represents a side elevation of a machine embodying my invention. Fig. 2 represents an end elevation of the same. Fig. 3 represents an enlargement of a portion of Fig. 1. Fig. 4 represents a section on line 4—4 of Fig. 3. Fig. 5 represents a section on line 5—5 of Fig. 3, and an elevation of the parts at the left of said line. Fig. 6 represents a section on line 6—6 of Fig. 3. Fig. 7 represents a section on line 7—7 of Fig. 6.

The same letters of reference indicate the same parts in all the figures.

In the drawings 12 represents a fixed horizontal track, which is supported by any suitable means, such as legs 13, supporting a fixed bed or table 14, on which rests the sheet or pane of glass 15, the edge of which is to be formed by the machine. The bed 14 is preferably horizontal, and is of suitable size to support the largest plate 15 that is likely to be operated upon. When the plate 15 is in position on the bed, one edge of the plate projects over the corresponding edge of the bed, as indicated in Figs. 5 and 6, so that there is an unobstructed space below as well as above the edge of the sheet to be formed, said space permitting the grinding wheel hereinafter described, to project at any desired angle under the edge of the sheet, as indicated in Fig. 5. The track 12 supports a grinding wheel carrier, which is movable lengthwise of the track, said carrier comprising a slide 16 which engages the track 12, and has a sliding fit thereon, a vertical standard 17, supported by the slide, and projecting upwardly therefrom, and a head 18 which is adjustably connected as hereinafter described, with the upper portion of the standard 17, and is provided with bearings 19 in which are journaled a shaft 20, to which the grinding wheel 21 is affixed, said grinding wheel being preferably a disk of cast iron, the outer face of which is suitably dressed or formed to have a grinding action on glass when supplied with a suitable grinding composition supplied to the face of the wheel by means presently described. The head 18 is rotatively adjustable relatively to the standard 17, so that the head, shaft and wheel are capable of being tipped to give the acting face of the wheel a suitable inclination to produce the desired bevel on the edge of the plate 15, as indicated in Fig. 5, the means for permitting the rotative adjustment being such that the head is adapted to turn on a horizontal axis parallel with the path of movement of the carrier so that the acting face of the grinding wheel may be swung from the vertical position shown in Fig. 6 to an inclined position, as shown in Fig. 5, any desired inclination being attainable. The means for rotatively adjusting the head shown in this embodiment of my invention, comprise a face plate 22 formed on the upper end of the standard 17, and provided with segmental slots 23 (Fig. 2) and a complemental face plate 24 formed as a flange on the head 18, and provided with bolts 25 passing through the segmental slots 23. When said bolts are loosened, the head 18 and face plate 24 are permitted to turn on the face plate 22, their movement being guided by the segmental slots 23 so that the movement is rotative, said slots and bolts constituting the equivalent of a central stud or axis on the face plate 24 journaled in the face plate 22.

The portion of the head 18 on which the bearings of the shaft 20 are mounted, is preferably made as an independent piece or section 26, which, for convenience, I will hereinafter refer to as the upper section of the head, the portion of the head on which the face plate 24 is formed being termed the lower section. The upper section 26 is rotatively adjustable relatively to the lower section 18 on a vertical axis to permit the acting face of the grinding wheel to occupy an oblique position relatively to the edge of the sheet 15, one edge of the wheel being in advance of the other, as indicated in Fig. 7, the object of this adjustment being to cause the acting face of the wheel, which is beveled, to bear on the edge of the sheet only at one side of the axis of rotation of the wheel. The rotative adjustment of the upper section of the head permits the wheel to be adjusted so that either of its edges may project in advance of the other, as shown in full and dotted lines in Fig. 7. The object of this adjustment is to insure the movement of the acting portion of the wheel toward the acute angle of the edge of the plate on which it is operating, instead of away from said acute angle, the principle being the same as that involved in grinding a knife when the grinding tool is moved toward the edge of the knife, instead of away from it, in order to avoid the formation of a wire edge. In grinding glass, if the acting face of the grinding wheel moves away from the acute angle of the edge being formed, the material forming the edge is liable to be slightly fractured or broken away, causing irregularity and raggedness. This is prevented by the means for rotatively adjusting the upper section of the head to cause that portion of the wheel which is in the plane of the plate 15, to stand obliquely to the edge of the plate, so that only the portion of the wheel at one side of its axis, touches the plate, the other side being withdrawn from the plate, as indicated in Fig. 7. The wheel rotates in the direction of arrow X when adjusted to the position shown in full lines, the carriage at the same time moving in the direction of the arrow Y. When the wheel is adjusted to the position shown by dotted lines, the rotation of the wheel and the movement of the carriage are in the direction opposite that indicated by the arrows X and Y. The means by which the last-described rotative adjustment is effected, as here shown comprise a stud or trunnion 27 (Figs. 6 and 7) formed on the upper section 26, and a socket or bearing 28 formed for the reception of said stud in a part of the head which is preferably an independent intermediate section 29, as hereinafter described. The stud and bearing permit the upper section to turn on a vertical axis. The upper section is positively secured to the intermediate section at any position to which it may be thus adjusted by means of clamping nuts 30 engaged with bolts which are affixed to and project upwardly from the intermediate section 29, said bolts passing through segmental slots 31 in the upper section 26. When the nuts 30 are loosened, the upper section may be turned freely on its vertical axis, and when the nuts are tightened, the upper section is positively held at the desired adjustment. The intermediate section 29 is adapted to slide between guides or gibs 31 (Fig. 3) formed on the lower section of the head, said intermediate and upper sections being thus movable toward and from the supporting bed 14 to give the grinding wheel any desired lateral adjustment. An adjusting screw 32 journaled in an ear on the lower section 18 engages a tapped socket in the intermediate section 29, the rotation of said screw causing a movement of the sections 29 and 26 on the lower section 18. 33 represents a handle formed on one of the bearings 19 for convenience in moving the head from one position of adjustment to another. I have hereinafter referred to the above-described mechanism as means for holding the face of the wheel obliquely to the plate 15.

The standard 17 is vertically adjustable relatively to the slide 16 to vary the height of the grinding wheel. The means here shown for effecting this vertical adjustment comprise a socket 34, which is suitably supported by the slide, preferably by arms 35 formed as gibs or guides, on which the socket 34 may slide horizontally, the standard 17 having a sliding fit in the socket 34, and adapted to move vertically therein. The socket is provided with a clamping block 36 (Fig. 4) which forms a part of the inner surface of the socket, and is adjustable by means of an adjusting screw 37, so that it may be pressed against the standard 17 to lock the latter to the socket, or released from the standard to permit the latter to move freely in the socket. The sliding connection between the socket 34 and the arms 35 permit a horizontal adjustment of the standard, an adjusting screw 38 (Fig. 6) being provided to horizontally adjust the socket, and hold it in any position to which it may be adjusted.

While the grinding wheel may be rotated by hand or by any other suitable means, it is obvious that mechanism for rotating it by power is desirable, and that such mechanism must have provisions for rotating the grinding wheel while the carrier is at any part of its travel. The mechanism here shown comprises an elongated driving pulley 40 which may be rotated by power applied in any suitable way, and is journaled in bearings above the track 12 and bed 14, the length of the pulley 40 being substantially equal to the length of the travel of the carrier in each direction.

41 represents an intermediate shaft journaled in bearings 42 on the upper section 26 of the head, said shaft having a beveled gear 43 meshing with a beveled gear 44 affixed to the grinding wheel shaft 20. The shaft 41 also has a pulley 45 which engages a driving belt 46 mounted on the elongated pulley 40.

47 and 48 represent idle pulleys which are journaled in bearings on an arm 49, Fig. 5, which is pivoted at 50 to the carrier and is provided with a weight 51. The idle pulleys 47 and 48 engage bights of the belt 46 in such manner as to hold another bight of the belt in engagement with the pulley 45 on the head, as indicated in Fig. 5, provisions being thus made for maintaining the driving connection between the belt and the pulley 45 as well as a driving connection between the elongated belt and the driving pulley 40. The belt follows the movements of the carrier along the track, and therefore moves from end to end of the pulley 40.

The carrier may be moved along the track 12 to carry the grinding wheel along the edge of the plate 15 by any suitable means. I have here shown power mechanism for moving the carrier and for automatically reversing its movement at each end of its travel. Said mechanism comprises two sprocket wheels 52 53, the shafts of each being journaled in fixed bearings at opposite ends of the track 12, and a sprocket chain 54 engaging said wheels and attached at 55 55 to the side 16.

56 represents a driving shaft having two fast pulleys 57 58 and an intermediate loose pulley 59, the said shaft 56 having a worm 60 meshing with a worm gear 61 affixed to the shaft of the sprocket wheel 52.

63 and 64 represent belts driven from an overhead shaft, the belt 63 being open while the belt 64 is crossed. The said belts are transferable on the pulleys 57 58 59, the arrangement being such that the cross belt 64 may engage either the fast pulley 58 or the loose pulley 59, while the open belt 63 may engage either the fast pulley 57 or the loose pulley 59. When the belt 63 is engaged with a fast pulley, the shaft 56 is rotated in one direction, and when the cross belt 64 is engaged with a fast pulley, the shaft 56 is rotated in the opposite direction. A belt shipper 66 is engaged with the belts 63 64 and adapted to transfer or ship them as above indicated.

67 represents a shipper rod connected with the shipper 66, and movable longitudinally in fixed guide arms 68. The shipper rod is provided at suitable intervals with collars 69, arranged to be moved by an arm 70 affixed to the slide 16, said arm having an eye 71 which embraces the shipper rod, and is adapted to move thereon between the collars 69, the arrangement being such that when the carrier approaches either end of its movement, the arm 70 will engage one of the collars 69 and move the shipper endwise, thus operating the belt shipper in such manner as to cause the reversal of the movement of the carrier. Suitable tension of the sprocket chain 54 may be provided by means of an idle sprocket wheel 72, mounted in a yoke 73 which is supported by a spring 74.

75 represents a receptacle adapted to hold a grinding composition or mixture which is delivered to the wheel by means of an inclined spout 76 which receives the mixture through the valved outlet 77 of the receptacle 75. The receptacle 77 is supported by a bent arm 78 affixed to and rising from the carrier. The spout 76 is supported by rods 79 from the receptacle 75. The receptacle and spout therefore move with the carrier and grinding wheel, the spout being arranged to deliver the grinding composition to the acting face of the wheel.

80 represents a flexible pipe which conducts water from a fixed supply pipe to the upper portion of the spout 76, the nozzle of the pipe 80 being connected by an arm 81 with the upper portion of the spout and being provided with a valve 82.

83 represents a guard which partially incloses the grinding wheel and prevents the scattering of the grinding composition.

84 represents an elongated trough located below the bed 14, said trough being adapted to catch the grinding composition and water which may drop from the grinding wheel.

It will be seen that provision is made for giving the grinding wheel any desired adjustment, and for moving it back and forth along the edge to be formed or dressed, so that said edge may be formed at right angles with the sides of the plate or at any other desired angle.

I have hereinbefore referred to the grinding wheel as preferably made of cast iron. I desire it to be understood that said wheel is used for the first operation of roughing out the edge of the sheet in giving it approximately the desired form, the bulk of the material removed in forming the edge being removed by the cast iron grinding wheel. Said wheel is detachably secured to the shaft 20 by means of a nut 85, as shown in Fig. 6. After the first or roughing out operation, the wheel 21 may be removed, and different wheels subsequently used successively for finishing the edge. For example, a smoothing wheel of freestone may follow the grinding wheel, said wheel being supplied with water during the operation, and removing the rough formation left by the grinding wheel. The smoothing wheel may then be removed, and what is known as a white wheel, made of wood, substituted for it, wet pumice being used with the said white wheel. The white wheel performs the next step in the operation of finishing the edge. The final operation may be performed by what is known as a rouge or buffing wheel, which imparts the final finish and polish. The said wheels are used successively and interchangeably, each being applied in turn to the shaft 20.

It will be seen that the rotative adjustability of the head relatively to the supporting standard, is such that the operating wheel may stand in a horizontal plane, as indicated by dotted lines in Fig. 2. When the wheel is so adjusted, its periphery, instead of one of its side faces, may be presented to the edge of the sheet, the periphery being grooved to impart a semi-circular or a three-sided edge to the plate, according to the uses to which the plate is to be put. For show case work it is desirable to thus mold the edges of the sheet, the molded edge being semi-circular or rounded in some cases, and in other cases polygonal. It will be understood that a series of wheels will be used for molding the edge of a plate; that is to say, a grinding wheel, smoothing wheel, white wheel and a rouge wheel will be successively used in this operation.

From the foregoing it will be seen that I have provided for imparting any desired form to the edge of a sheet of plate glass without moving or changing the position of the plate after it is once adjusted for the forming operation. I am enabled to do this by the described means for imparting the various adjustments to the grinding wheel and using grinding and finishing wheels having different characteristics, successively as described. I have not attempted to show in Figs. 2 and 6 the proper vertical adjustment of the grinding wheel when the same is in a vertical position with its shaft horizontal, and in a horizontal position with its shaft vertical. It will be understood, however, that when the shaft is horizontal, the acting face of the wheel being vertical, as shown by full lines in Figs. 2 and 6, the adjustment of the wheel should be such that the center of the wheel will be considerably above the edge of the plate 15. When the wheel is adjusted to a horizontal position, its shaft being vertical so that the perimeter of the wheel acts on the edge of the plate, the adjustment should be such as to bring the perimeter of the wheel to the level of the plate.

Having in mind the capability of adjusting the grinding wheel so that its perimeter will act on the edge of the plate, the shaft of the wheel being then in a vertical position, the importance of the horizontal adjustability of the socket 34 and standard 17 will be apparent, as affording the only means for moving the perimeter of the wheel toward and from the edge of the plate 15.

I claim:—

1. In a plate-edge forming machine, in combination, a fixed track, a slide engaging the track, a head having a rotary shaft carrying an operating wheel, a plate-supporting bed adjacent to the head, and adjustable connections between the head and the slide, said connections having means for holding the face of the wheel at various angles of inclination crosswise of the edge of a plate on the bed, and means for holding the face of the wheel obliquely to said edge, whereby the wheel may be caused to act on a beveled edge without liability of fracturing the acute angle of said edge, substantially as set forth.

2. In a plate-edge forming machine, in combination, a fixed track, a slide engaging the track, a head having a rotary shaft carrying an operating wheel, a plate-supporting bed adjacent to the head, and adjustable connections between the head and the slide, said connections having means for holding the face of the wheel not only at various angles of inclination crosswise of the edge of the plate on the bed, but also horizontally with the periphery of the wheel in engagement with the said edge, whereby a peripherally grooved wheel may be employed adapted to impart a semicircular or other form to the edge of the sheet, means for moving the head vertically, and means for moving the head horizontally toward and from the table.

3. In a plate-edge-forming machine, in combination, a fixed track, a carrier comprising a track-engaging slide, a standard supported by the slide, and a head having a lower section which is rotatively adjustable on the standard, and an upper section which is rotatively adjustable on the lower section, a shaft journaled in bearings on the head and provided with an operating wheel, and a fixed plate-supporting bed adjacent to the head, the rotative adjustability of the lower section of the head being such as to permit the face of the wheel to stand at various angles of inclination, while the adjustability of the upper section is such as to permit the face of the wheel to stand obliquely to the edge of the plate.

4. In a plate-edge-forming machine, in combination, a fixed track, a carrier comprising a track-engaging slide having a guide or socket, a standard vertically adjustable in the socket, (the latter having means for positively securing the standard at any position to which it may be adjusted) and a head adjustably connected with the standard, a shaft journaled in bearings on the head and provided with an operating wheel, and a fixed plate-supporting bed adjacent to the head.

5. In a plate-edge-forming machine, an operating wheel carrier comprising a track-engaging slide having a guide or socket, a standard adjustable therein, and provided with a face plate at its upper portion, means for securing the standard to the guide in any position to which it may be adjusted, a head composed of a lower section having a face plate rotatively adjustable on the face plate of the standard, and an upper section rotatively adjustable on the lower section, and a shaft journaled in bearings on the upper section and provided with an operating wheel, means being provided for positively securing the lower section to the standard and the upper section to the lower section.

6. In a plate-edge-forming machine, in combination, a fixed track, a carrier comprising a slide engaging the track and a head adjustably connected with the slide, a shaft journaled in bearings on the head and provided with an operating wheel, a fixed plate-supporting bed adjacent to the head, an elongated driving pulley above the track and bed, a belt driven by said pulley and adapted to move lengthwise of the latter, an intermediate shaft on the head geared to the operating wheel shaft and provided with a pulley engaging said belt, and weighted idle pulleys connected with the carrier and located below the head, said pulleys engaging the belt and holding it in engagement with the pulley of the intermediate shaft.

7. In a plate-edge-forming machine, in combination, a fixed track, a carrier comprising a slide engaging the track and a head adjustably connected with the slide, a shaft journaled in bearings on the head and provided with an operating wheel, a fixed plate-supporting bed adjacent to the head, mechanism for rotating said shaft and wheel, and carrier-operating mechanism comprising sprocket wheels at opposite ends of the track, a chain attached to the slide and engaging said wheels, means for rotating one of said sprocket wheels, and means operated by movements of the carrier for automatically reversing the direction of rotation to reverse the movement of the carrier.

8. In a plate-edge-forming machine, in combination, a fixed track, a carrier comprising a slide engaging the track and a head adjustably connected with the slide, a shaft journaled in bearings on the head and provided with an operating wheel, a fixed plate-supporting bed adjacent to the head, mechanism for rotating said shaft and wheel, sprocket wheels at opposite ends of the track, a chain attached to the slide and engaging said wheels, a driving shaft geared to the shaft of one of the sprocket wheels, two fast pulleys, and an intermediate loose pulley on said driving shaft, two driving belts, one crossed and the other open, adapted to simultaneously engage the loose pulley and one of the fast pulleys, a belt shipper engaged with said belts, and a shipper rod connected with the shipper and provided with collars, and an arm on the slide movable between said collars, and adapted to engage the same alternately to move the shipper rod.

9. In a plate edge forming machine, in combination, a fixed track, a carrier comprising a track-engaging slide having substantially horizontal guides, a substantially vertical guide or socket movable in said guides toward and from the track, means for positively securing the socket in any position to which it may be adjusted, a standard vertically adjustable in the socket, and a head adjustably connected with the standard, a shaft journaled in bearings on the head and provided with an operating wheel, and a fixed plate-supporting bed adjacent to the head.

In testimony whereof I have affixed my signature, in presence of two witnesses.

JAMES MILLEN.

Witnesses:
C. F. BROWN,
E. BATCHELDER.